US008666751B2

(12) United States Patent
Murthi et al.

(10) Patent No.: US 8,666,751 B2
(45) Date of Patent: Mar. 4, 2014

(54) AUDIO PATTERN MATCHING FOR DEVICE ACTIVATION

(75) Inventors: Raghu Murthi, Bellevue, WA (US); Edward C. Giaimo, III, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 145 days.

(21) Appl. No.: 13/299,218

(22) Filed: Nov. 17, 2011

(65) Prior Publication Data
US 2013/0132095 A1 May 23, 2013

(51) Int. Cl.
*G10L 21/00* (2013.01)

(52) U.S. Cl.
USPC ............ 704/275; 704/231; 704/251; 704/270

(58) Field of Classification Search
USPC .................. 704/231, 251, 270–275
See application file for complete search history.

(56) References Cited

U.S. PATENT DOCUMENTS

| | | | |
|---|---|---|---|
| 5,983,186 A | 11/1999 | Miyazawa et al. | |
| 6,324,514 B2 | 11/2001 | Matulich et al. | |
| 6,339,706 B1 | 1/2002 | Tillgren et al. | |
| 6,756,700 B2 | 6/2004 | Zeng | |
| 7,231,235 B2 | 6/2007 | Harrold | |
| 7,321,857 B2 | 1/2008 | Rodriguez et al. | |
| 2007/0192109 A1 | 8/2007 | Likens et al. | |
| 2009/0106027 A1 | 4/2009 | Teranishi et al. | |

FOREIGN PATENT DOCUMENTS

KR  1020060096684  9/2006

OTHER PUBLICATIONS

Kristina Dems, "The Best Electronic Games: Buying Guide", Bright Hub, Feb. 18, 2011 http://www.brighthub.com/electronics/gizmos-gadgets/articles/107181.aspx.
Ross Miller, "Kinect for Xbox 360 review", Engadget, Nov. 4, 2010 http://www.engadget.com/2010/11/04/kinect-for-xbox-360-review/.
International Search Report and Written Opinion dated Mar. 28, 2013 in International Patent Application No. PCT/US2012/064898.
English Abstract for KR1020060096684 published Sep. 13, 2006.

*Primary Examiner* — Douglas Godbold
(74) *Attorney, Agent, or Firm* — Judy Yee; Raghu Chinagudabha; Micky Minhas (57) ABSTRACT

A system and method are disclosed for activating an electric device from a standby power mode to a full power mode. The system may include one or more microphones for monitoring audio signals in the vicinity of the electric device, and a standby power activation unit including a low-power microprocessor and a non-volatile memory. Audio captured by the one or more microphones is digitized and compared by the microprocessor against predefined activation pattern(s) stored in the non-volatile memory. If a pattern match is detected between the digital audio pattern and a predefined activation pattern, the electric device is activated.

18 Claims, 8 Drawing Sheets

AUDIO PATTERN MATCHING FOR DEVICE ACTIVATION

BACKGROUND

It is common practice to run idle or switched off electric devices in a standby power mode, where the device consumes a reduced amount of electricity. The typical standby power of an electric device may for example be up to about 8 Watts. However, taken across the billions of electric devices in use, even this small amount adds up to an appreciable fraction of total world electricity consumption. Initiatives such as the One Watt Initiative by the International Energy Agency (IEA) are attempting to reduce standby power in electric devices to 0.5 Watts by the year 2013. It would be advantageous to allow simplified activation of electric devices in standby power mode, even when operating at 0.5 Watts.

SUMMARY

The present technology in general relates to a system included in an electric device for activating the device from a standby power mode to a full power mode. The system includes one or more microphones and a standby activation unit. The standby activation unit includes a processor such as a microprocessor and an associated non-volatile memory. One or more digitized activation phrases may be stored in the non-volatile memory, either pre-recorded prior to first use by a user, or selected and entered by a user.

When the electric device is running in standby power mode, the one or more microphones are powered to sense sound in a vicinity of the microphone. In order to activate the electric device when in standby power mode, a user may speak a pre-recorded or user-selected activation phrase matching one stored in the non-volatile memory. The audio stream is detected by the one or more microphones and digitized into an audio pattern. The audio pattern is then compared by the processor of the standby activation unit against the one or more activation phrases stored in the non-volatile memory. If the spoken phrase matches a stored activation phrase, the processor will identify a match, and send a signal to the power circuit to activate the electric device to full power mode. Where no match is identified by the processor between a received audio pattern and the stored activation phrase(s), the electric device remains in standby power mode.

The microphone and standby activation unit are capable of receiving an audio stream, digitizing it into an audio pattern and performing the matching operation to compare incoming audio patterns to the stored activation phrase(s), all with the power available in standby mode. In one example, this power may be 0.5 Watts.

In embodiments, the present technology relates to a method for activating an electric device from a standby power mode, comprising: (a) receiving an audio stream in the electric device when in standby power mode; (b) digitizing the audio stream to an audio pattern when in standby power mode; (c) comparing the audio pattern digitized in said step (b) to a digitized activation phrase stored in a non-volatile memory when in standby power mode; and (d) activating the electric device where the audio pattern matches the activation phrase to within a predefined tolerance.

In another example, the present technology relates to a standby activation system for activating an electric device from a standby power mode, the standby activation unit comprising: one or more microphones for detecting an audio stream in a vicinity of the one or more microphones; and a standby activation unit, including: a non-volatile memory including one or more stored activation patterns, and a processor for comparing a digitized audio pattern received from the one or more microphones to the one or more stored activation patterns stored in the non-volatile memory using power available to the electric device in standby power mode, the processor activating the device if the digitized audio pattern matches an activation phrase of the one or more activation phrases stored in the non-volatile memory to within a predefined tolerance.

In a further example, the present technology relates to a computer-readable storage medium having computer-executable instructions for programming a processor to perform a method for activating a computing device of a natural user interface NUI system from a standby power mode, comprising: (a) receiving an audio stream in one or more microphones associated with the NUI system when in standby power mode; (b) digitizing the audio stream to an audio pattern when in standby power mode; (c) processing the digitized audio stream to facilitate matching of the digitized audio stream with one or more digitized activation phrases stored in a non-volatile memory of the computing device when in standby power mode; (d) comparing the audio pattern processed in said step (c) to one or more digitized activation phrases stored in the non-volatile memory of the computing device when in standby power mode; and (e) activating the computing device where the audio pattern matches an activation phrase of the one or more activation phrases to within a predefined tolerance.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

DETAILED DESCRIPTION

Embodiments of the present technology will now be described with reference to FIGS. 1A-7, which in general relate to a system included in an electric device for activating the device from a standby power mode to a full power mode. In one example, the electric device may be a NUI system described below as a target recognition, analysis, and tracking system 10. A NUI system may be a system where user gestures are detected, interpreted and used to control on-screen characters or other aspects of a software application. However, as further described below, the electric device can be a variety of other computing devices and appliances. In embodiments, the system of the present disclosure includes one or more microphones for monitoring audio signals in the vicinity of the electric device, and a standby power activation unit including a low-power microprocessor and a non-volatile memory. When the device is in a standby power mode, the microphone captures audio, and converts the audio to a digital audio pattern. This audio pattern is then compared by the microprocessor against predefined activation pattern(s) stored in the non-volatile memory. If a pattern match is detected between the digital audio pattern and a predefined activation pattern, the electric device is activated.

The one or more microphones, microprocessor and non-volatile memory together are able to obtain audio patterns and compare them against stored activation patterns using a small amount of power, for example 0.5 Watts. Thus, the present system may be used to activate the electric device while the electric device is in a standby power mode, i.e., either idle or shut down. When in the standby power mode, the electric device described below receives a standby power, which in examples may be 0.5 Watts. It is understood that the standby power may be higher or lower than this in further embodiments, and that the present system would be operable at such higher or lower standby power settings.

Figure 1A:
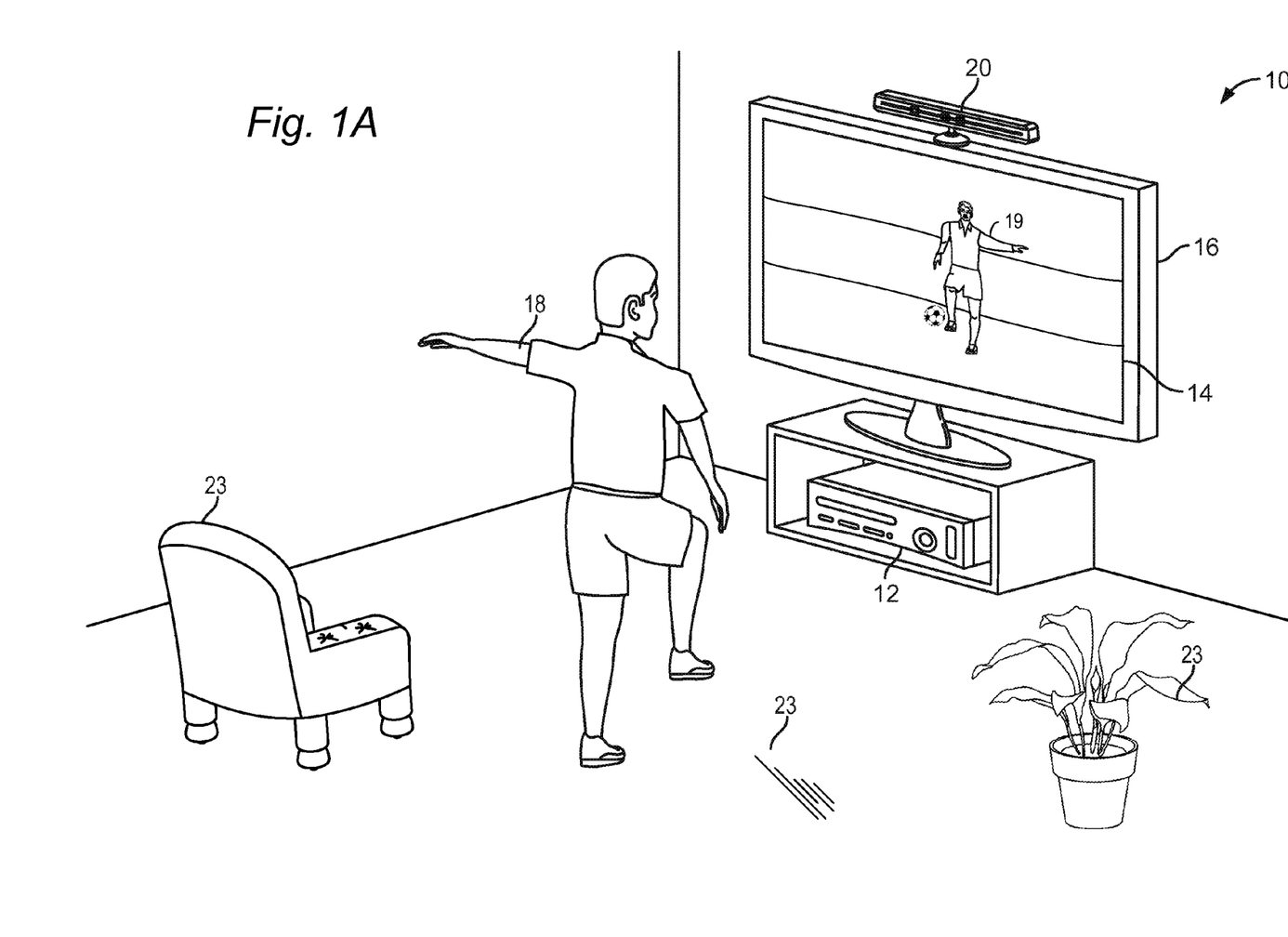
FIGS. 1A-1B illustrate example embodiments of a target recognition, analysis, and tracking system with a user playing a game.
Figure 1B:
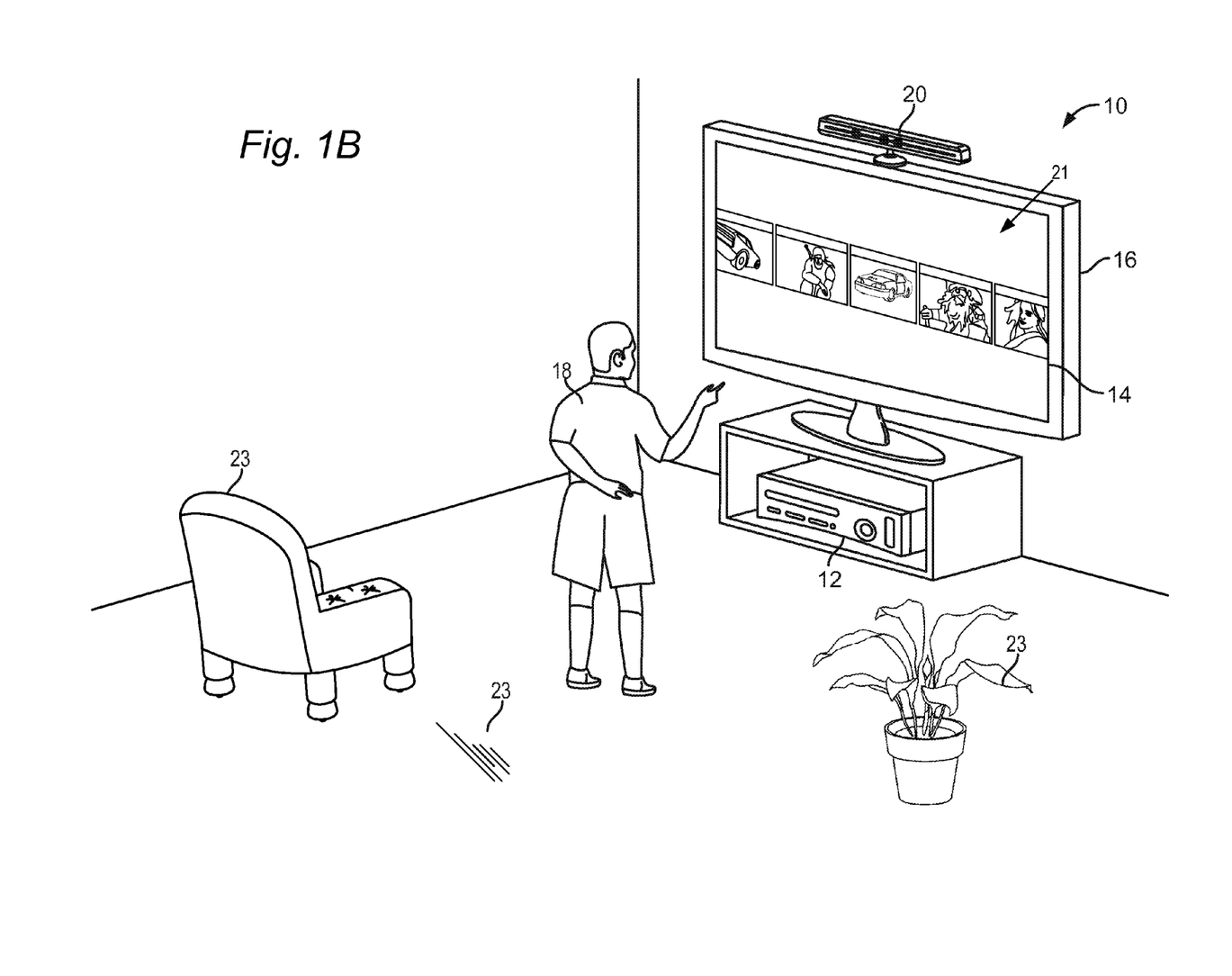
Figure 2:
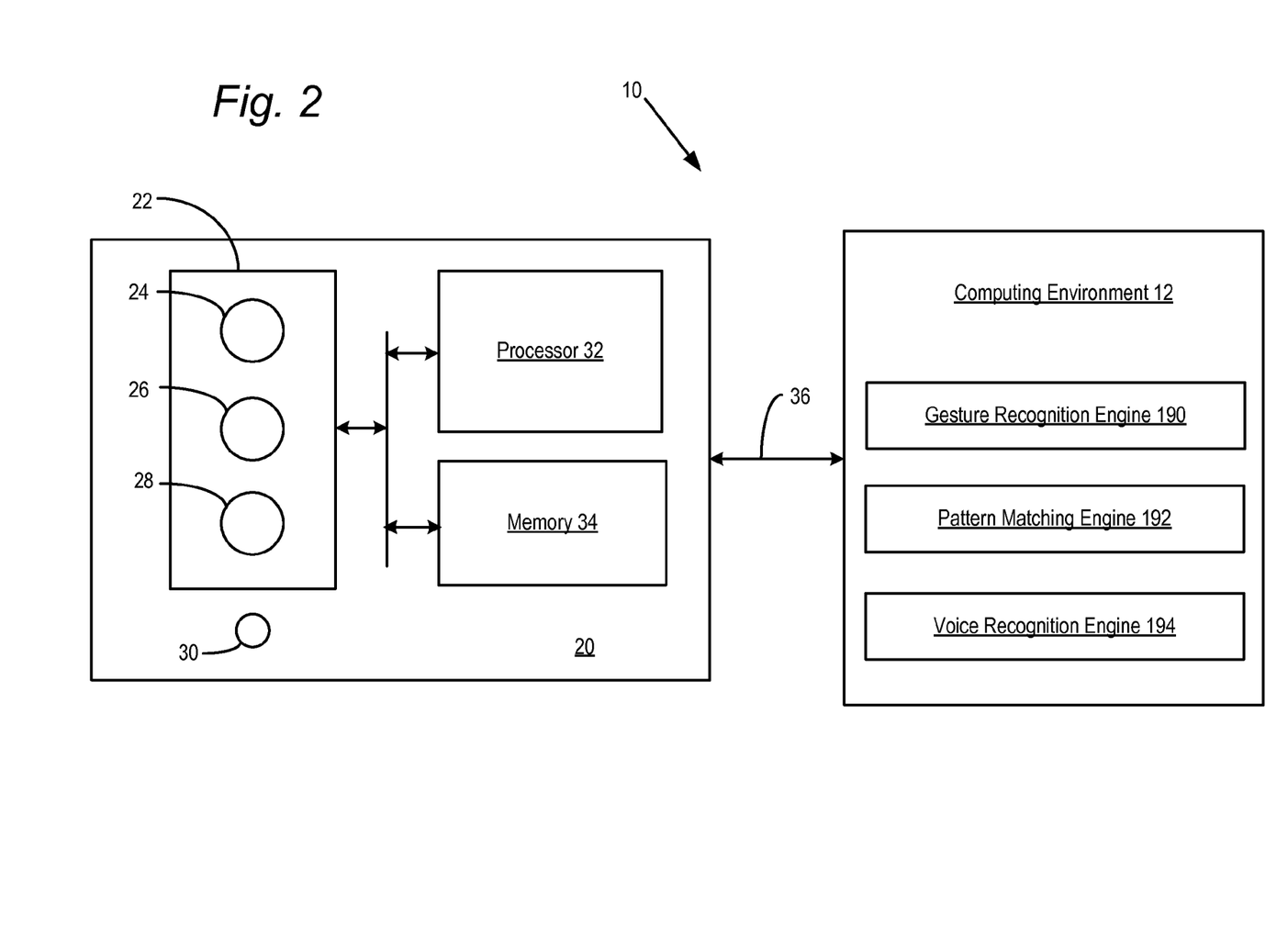
FIG. 2 illustrates an example embodiment of a capture device that may be used in a target recognition, analysis, and tracking system.

Referring initially to FIGS. 1A-2, the hardware for implementing one example of the present technology includes a target recognition, analysis, and tracking system 10 which may be used to recognize, analyze, and/or track a human target such as the user 18. Embodiments of the target recognition, analysis, and tracking system 10 include a computing device 12 for executing a gaming or other application. The computing device 12 may include hardware components and/or software components such that computing device 12 may be used to execute applications such as gaming and non-gaming applications. In one embodiment, computing device 12 may include a processor such as a standardized processor, a specialized processor, a microprocessor, or the like that may execute instructions stored on a processor readable storage device for performing processes of the device 10 when active and running on full power.

As described hereinafter, the computing device 12 may further include a second, low power processor or microprocessor that may execute instructions stored in a non-volatile memory for performing an activation process of the device 10 when running in standby mode.

The system 10 further includes a capture device 20 for capturing image and audio data relating to one or more users and/or objects sensed by the capture device. In embodiments, the capture device 20 may be used to capture information relating to body and hand movements and/or gestures and speech of one or more users, which information is received by the computing environment and used to render, interact with and/or control aspects of a gaming or other application. Examples of the computing device 12 and capture device 20 are explained in greater detail below.

Embodiments of the target recognition, analysis and tracking system 10 may be connected to an audio/visual (A/V) device 16 having a display 14. The device 16 may for example be a television, a monitor, a high-definition television (HDTV), or the like that may provide game or application visuals and/or audio to a user. For example, the computing device 12 may include a video adapter such as a graphics card and/or an audio adapter such as a sound card that may provide audio/visual signals associated with the game or other application. The A/V device 16 may receive the audio/visual signals from the computing device 12 and may then output the game or application visuals and/or audio associated with the audio/visual signals to the user 18. According to one embodiment, the audio/visual device 16 may be connected to the computing device 12 via, for example, an S-Video cable, a coaxial cable, an HDMI cable, a DVI cable, a VGA cable, a component video cable, or the like.

In embodiments, the computing device 12, the A/V device 16 and the capture device 20 may cooperate to render an avatar or on-screen character 19 on display 14. For example, FIG. 1A shows a user 18 playing a soccer gaming application. The user's movements are tracked and used to animate the movements of the avatar 19. In embodiments, the avatar 19 mimics the movements of the user 18 in real world space so that the user 18 may perform movements and gestures which control the movements and actions of the avatar 19 on the display 14. In FIG. 1B, the capture device 20 is used in a NUI system where, for example, a user 18 is scrolling through and controlling a user interface 21 with a variety of menu options presented on the display 14. In FIG. 1B, the computing device 12 and the capture device 20 may be used to recognize and analyze movements and gestures of a user's body, and such movements and gestures may be interpreted as controls for the user interface.

Suitable examples of a system 10 and components thereof are found in the following co-pending patent applications, all of which are hereby specifically incorporated by reference: U.S. patent application Ser. No. 12/475,094, entitled "Environment and/or Target Segmentation," filed May 29, 2009; U.S. patent application Ser. No. 12/511,850, entitled "Auto Generating a Visual Representation," filed Jul. 29, 2009; U.S. patent application Ser. No. 12/474,655, entitled "Gesture Tool," filed May 29, 2009; U.S. patent application Ser. No. 12/603,437, entitled "Pose Tracking Pipeline," filed Oct. 21, 2009; U.S. patent application Ser. No. 12/475,308, entitled "Device for Identifying and Tracking Multiple Humans Over Time," filed May 29, 2009, U.S. patent application Ser. No. 12/575,388, entitled "Human Tracking System," filed Oct. 7, 2009; U.S. patent application Ser. No. 12/422,661, entitled "Gesture Recognizer System Architecture," filed Apr. 13, 2009; and U.S. patent application Ser. No. 12/391,150, entitled "Standard Gestures," filed Feb. 23, 2009.

FIG. 2 illustrates an example embodiment of the capture device 20 that may be used in the target recognition, analysis, and tracking system 10. In an example embodiment, the capture device 20 may be configured to capture video having a depth image that may include depth values via any suitable technique including, for example, time-of-flight, structured light, stereo image, or the like. According to one embodiment, the capture device 20 may organize the calculated depth information into "Z layers," or layers that may be perpendicular to a Z axis extending from the depth camera along its line of sight. X and Y axes may be defined as being perpendicular to the Z axis. The Y axis may be vertical and the X axis may be horizontal. Together, the X, Y and Z axes define the 3-D real world space captured by capture device 20.

As shown in FIG. 2, the capture device 20 may include an image camera component 22. According to an example embodiment, the image camera component 22 may be a depth camera that may capture the depth image of a scene. The depth image may include a two-dimensional (2-D) pixel area of the captured scene where each pixel in the 2-D pixel area may represent a depth value such as a length or distance in, for example, centimeters, millimeters, or the like of an object in the captured scene from the camera.

As shown in FIG. 2, according to an example embodiment, the image camera component 22 may include an IR light component 24, a three-dimensional (3-D) camera 26, and an RGB camera 28 that may be used to capture the depth image of a scene. For example, in time-of-flight analysis, the IR light component 24 of the capture device 20 may emit an infrared light onto the scene and may then use sensors (not shown) to detect the backscattered light from the surface of one or more targets and objects in the scene using, for example, the 3-D camera 26 and/or the RGB camera 28.

In some embodiments, pulsed infrared light may be used such that the time between an outgoing light pulse and a corresponding incoming light pulse may be measured and used to determine a physical distance from the capture device 20 to a particular location on the targets or objects in the scene. Additionally, in other example embodiments, the phase of the outgoing light wave may be compared to the phase of the incoming light wave to determine a phase shift. The phase shift may then be used to determine a physical distance from the capture device 20 to a particular location on the targets or objects.

According to another example embodiment, time-of-flight analysis may be used to indirectly determine a physical distance from the capture device 20 to a particular location on the targets or objects by analyzing the intensity of the reflected beam of light over time via various techniques including, for example, shuttered light pulse imaging.

In another example embodiment, the capture device 20 may use a structured light to capture depth information. In such an analysis, patterned light (i.e., light displayed as a known pattern such as a grid pattern or a stripe pattern) may be projected onto the scene via, for example, the IR light component 24. Upon striking the surface of one or more targets or objects in the scene, the pattern may become deformed in response. Such a deformation of the pattern may be captured by, for example, the 3-D camera 26 and/or the RGB camera 28 and may then be analyzed to determine a physical distance from the capture device 20 to a particular location on the targets or objects.

According to another embodiment, the capture device 20 may include two or more physically separated cameras that may view a scene from different angles, to obtain visual stereo data that may be resolved to generate depth information. In another example embodiment, the capture device 20 may use point cloud data and target digitization techniques to detect features of the user.

The capture device 20 may further include a microphone 30. The microphone 30 may include a transducer or sensor that may receive and convert sound into an electrical signal. According to one embodiment, the microphone 30 may be used to reduce feedback between the capture device 20 and the computing device 12 in the target recognition, analysis, and tracking system 10. Additionally, the microphone 30 may be used to receive audio signals that may also be provided by the user to control applications such as game applications, non-game applications, or the like that may be executed by the computing device 12. Instead of a single microphone 30, the present system may employ two or more microphones. Multiple microphones allow acoustic source localization to identify the source of a sound.

In an example embodiment, the capture device 20 may further include a processor 32 that may be in operative communication with the image camera component 22. The processor 32 may include a standardized processor, a specialized processor, a microprocessor, or the like that may execute instructions that may include instructions for receiving the depth image, determining whether a suitable target may be included in the depth image, converting the suitable target into a skeletal representation or model of the target, or any other suitable instruction.

The capture device 20 may further include a memory component 34 that may store the instructions that may be executed by the processor 32, images or frames of images captured by the 3-D camera or RGB camera, or any other suitable information, images, or the like. According to an example embodiment, the memory component 34 may include random access memory (RAM), read only memory (ROM), cache, Flash memory, a hard disk, or any other suitable storage component. As shown in FIG. 2, in one embodiment, the memory component 34 may be a separate component in communication with the image camera component 22 and the processor 32. According to another embodiment, the memory component 34 may be integrated into the processor 32 and/or the image camera component 22.

As shown in FIG. 2, the capture device 20 may be in communication with the computing device 12 via a communication link 36. The communication link 36 may be a wired connection including, for example, a USB connection, a Firewire connection, an Ethernet cable connection, or the like and/or a wireless connection such as a wireless 802.11b, g, a, or n connection. According to one embodiment, the computing device 12 may provide a clock to the capture device 20 that may be used to determine when to capture, for example, a scene via the communication link 36.

Additionally, the capture device 20 may provide the depth information and images captured by, for example, the 3-D camera 26 and/or the RGB camera 28. With the aid of these devices, a partial skeletal model may be developed in accordance with the present technology, with the resulting data provided to the computing device 12 via the communication link 36.

The computing device 12 may further include a gesture recognition engine 190 for recognizing gestures. In accordance with the present system, the computing device 12 may further include a pattern matching engine 192, and, in embodiments, a voice recognition engine 194, both of which are explained below.

Figure 3A:
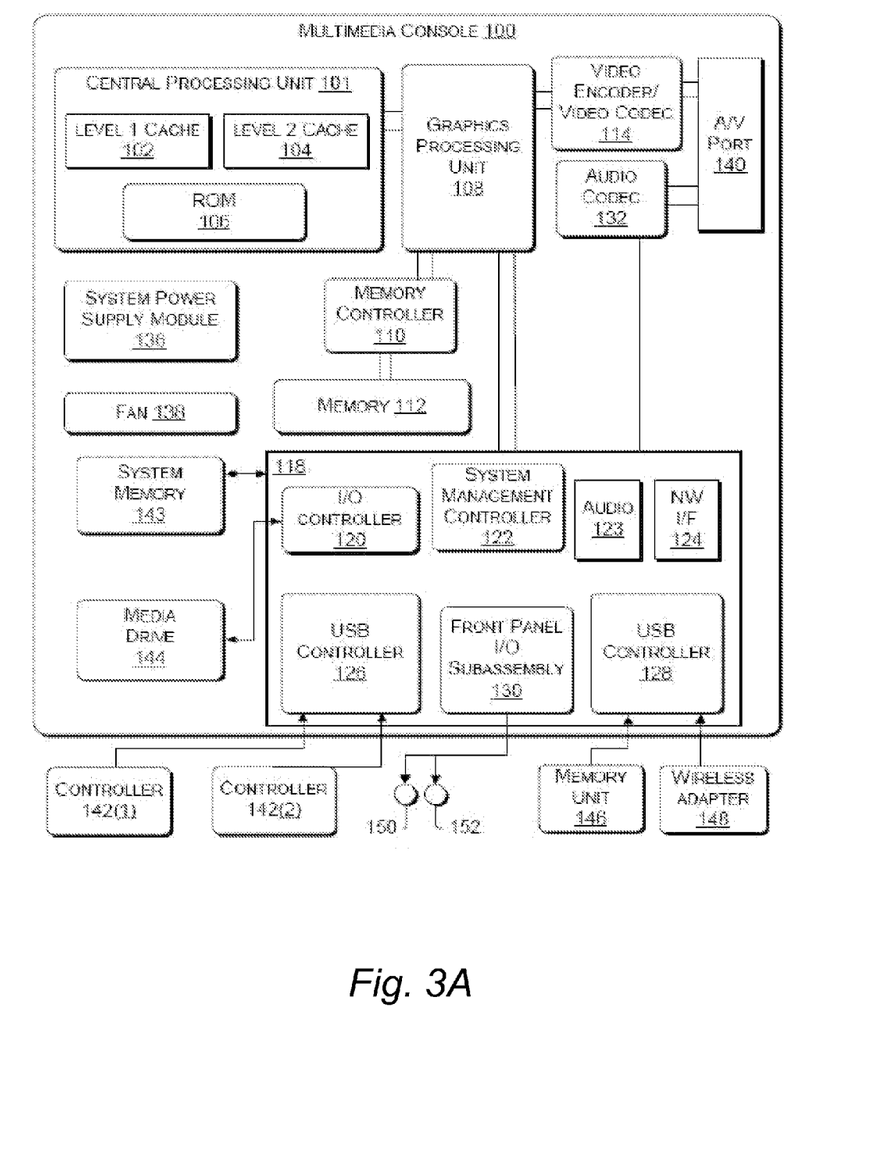
FIG. 3A illustrates an example embodiment of a computing environment that may be used to interpret one or more gestures in a target recognition, analysis, and tracking system.

FIG. 3A illustrates an example embodiment of a computing environment that may be used to interpret one or more gestures in a target recognition, analysis, and tracking system. The computing environment such as the computing device 12 described above with respect to FIGS. 1A-2 may be a multimedia console 100, such as a gaming console. As shown in FIG. 3A, the multimedia console 100 has a central processing unit (CPU) 101 having a level 1 cache 102, a level 2 cache 104, and a flash ROM 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The flash ROM 106 may store executable code that is loaded during an initial phase of a boot process when the multimedia console 100 is powered ON.

Although not shown in FIG. 3A, the multimedia console 100 may further include a processor such as a microprocessor and a non-volatile memory for activating the system from a standby power mode. In further embodiments, the processor and memory for activating the system from standby power mode may be the processing unit 101 and ROM 106, respectively.

A graphics processing unit (GPU) 108 and a video encoder/video codec (coder/decoder) 114 form a video processing pipeline for high speed and high resolution graphics processing. Data is carried from the GPU 108 to the video encoder/video codec 114 via a bus. The video processing pipeline outputs data to an A/V (audio/video) port 140 for transmission to a television or other display. A memory controller 110 is connected to the GPU 108 to facilitate processor access to various types of memory 112, such as, but not limited to, a RAM.

The multimedia console 100 includes an I/O controller 120, a system management controller 122, an audio processing unit 123, a network interface controller 124, a first USB host controller 126, a second USB host controller 128 and a front panel I/O subassembly 130 that are preferably implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface 124 and/or wireless adapter 148 provide access to a network (e.g., the Internet, home network, etc.) and may be any of a wide variety of various wired or wireless adapter components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive, etc. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection (e.g., IEEE 1394).

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 100 is powered ON, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 allows one or more users to interact with the system, watch movies, or listen to music. However, with the integration of broadband connectivity made available through the network interface 124 or the wireless adapter 148, the multimedia console 100 may further be operated as a participant in a larger network community.

When the multimedia console 100 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., popups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of the application resolution. A scaler may be used to set this resolution such that the need to change frequency and cause a TV resynch is eliminated.

After the multimedia console 100 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 101 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 142(1) and 142(2)) are shared by gaming applications and system applications. The input devices are not reserved resources, but are to be switched between system applications and the gaming application such that each will have a focus of the device. The application manager preferably controls the switching of input stream, without knowledge of the gaming application's knowledge and a driver maintains state information regarding focus switches. The cameras 26, 28 and capture device 20 may define additional input devices for the console 100.

Figure 3B:
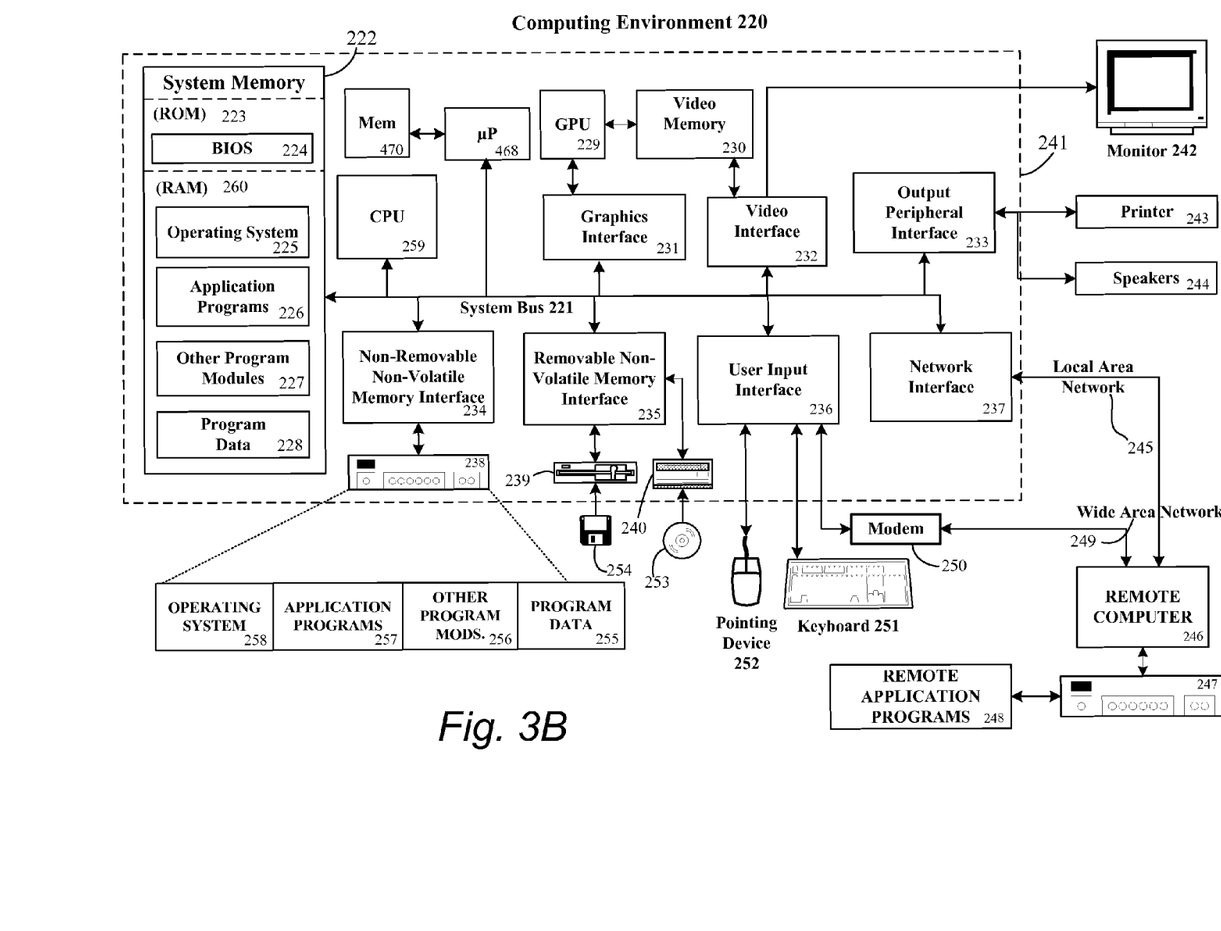
FIG. 3B illustrates another example embodiment of a computing environment that may be used to interpret one or more gestures in a target recognition, analysis, and tracking system.

FIG. 3B illustrates another example embodiment of a computing environment 220 that may be the computing device 12 shown in FIGS. 1A-2 used to interpret one or more gestures in a target recognition, analysis, and tracking system. The computing system environment 220 is only one example of a suitable computing environment and is not intended to suggest any limitation as to the scope of use or functionality of the presently disclosed subject matter. Neither should the computing environment 220 be interpreted as having any dependency or requirement relating to any one or combination of components illustrated in the exemplary operating environment 220. In some embodiments, the various depicted computing elements may include circuitry configured to instantiate specific aspects of the present disclosure. For example, the term circuitry used in the disclosure can include specialized hardware components configured to perform function(s) by firmware or switches. In other example embodiments, the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

In FIG. 3B, the computing environment 220 comprises a computer 241, which typically includes a variety of computer readable media. Computer readable media can be any available media that can be accessed by computer 241 and includes both volatile and nonvolatile media, removable and non-removable media. The system memory 222 includes computer storage media in the form of volatile and/or nonvolatile memory such as ROM 223 and RAM 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by a central processing unit 259. By way of example, and not limitation, FIG. 3B illustrates operating system 225, application programs 226, other program modules 227, and program data 228.

The computing environment may further include a processor 468, which in embodiments may be a microprocessor, and a non-volatile memory 470 for activating the system from a standby power mode. Memory 470 may be any of a variety of non-volatile memories, including for example ROM, PROM, EPROM, EEPROM and flash memory. In embodiments, the processor 468 and memory 470 for activating the system from standby power mode may be integrated as part of the central processing unit(s) 259 and ROM 223, respectively. In further embodiments, the processor 468 and memory 470 may be integrated together in a so-called system on a chip.

The computer 241 may also include other removable/non-removable, volatile/nonvolatile computer storage media. By way of example only, FIG. 3B illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through a non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 3B, provide storage of computer readable instructions, data structures, program modules and other data for the computer 241. In FIG. 3B, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and a pointing device 252, commonly referred to as a mouse, trackball or touch pad. Other input devices (not shown) may include a microphone, joystick, game pad, satellite dish, scanner, or the like. These and other input devices are often connected to the central processing unit 259 and microprocessor 468 through a user input interface 236 that is coupled to the system bus, but may be connected by other interface and bus structures, such as a parallel port, game port or a universal serial bus (USB). The cameras 26, 28 and capture device 20 may define additional input devices for the console 100. A monitor 242 or other type of display device is also connected to the system bus 221 via an interface, such as a video interface 232. In addition to the monitor, computers may also include other peripheral output devices such as speakers 244 and printer 243, which may be connected through an output peripheral interface 233.

The computer 241 may operate in a networked environment using logical connections to one or more remote computers, such as a remote computer 246. The remote computer 246 may be a personal computer, a server, a router, a network PC, a device or other common network node, and typically includes many or all of the elements described above relative to the computer 241, although only a memory storage device 247 has been illustrated in FIG. 3B. The logical connections depicted in FIG. 3B include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 3B illustrates remote application programs 248 as residing on memory device 247.

It will be appreciated that the network connections shown are exemplary and other means of establishing a communications link between the computers may be used.

The computing device 12 in conjunction with the capture device 20 may generate a computer model of a user's body position each frame. One example of such a pipeline which generates a skeletal model of one or more users in the field of view of capture device 20 is disclosed for example in U.S. patent application Ser. No. 12/876,418, entitled "System For Fast, Probabilistic Skeletal Tracking," filed Sep. 7, 2010, which application is incorporated by reference herein in its entirety.

The skeletal model may then be provided to the computing device 12 such that the computing environment may track the skeletal model and render an avatar associated with the skeletal model. The computing environment may further determine which controls to perform in an application executing on the computer environment based on, for example, gestures of the user that have been recognized from the skeletal model. For example, as shown, in FIG. 2, the computing device 12 may include a gesture recognition engine 190. The gesture recognition engine 190 may in general include a collection of gesture filters, each comprising information concerning a gesture that may be performed by the skeletal model (as the user moves).

The data captured by the cameras 26, 28 and device 20 in the form of the skeletal model and movements associated with it may be compared to the gesture filters in the gesture recognition engine 190 to identify when a user (as represented by the skeletal model) has performed one or more gestures. Those gestures may be associated with various controls of an application. Thus, the computing device 12 may use the gesture recognition engine 190 to interpret movements of the skeletal model and to control an application based on the movements.

In order to conserve power and make efficient use of energy, the system 10 may power down to a standby power mode if left idle for a predetermined period of time. Alternatively, a user may manually turn off the system 10 when done using it. When turned off, the system also runs in a standby power mode. When in standby power mode, the power supply 474 (FIG. 6) supplies a standby power to the computing device 12. In embodiments this standby power may for example be 0.3 Watts to 5.0 Watts, and in a further example, may be 0.5 Watts. It is understood that the power supplied to system 10 in the standby power mode may be higher or lower than this range in further embodiments.

In accordance with the present system, a user is able to activate the computing device 12 of the system 10 with an audible activation phrase. Upon recognition of the activation phrase, the computing device 12 may switch from the standby power mode to the full power mode where all system resources are available. The following describes activating the computing device 12 using a standby activation unit 464. With regard to the A/V device 16 and the capture device 20, to the extent these devices may also be in a standby power mode, they may be activated at the time the computing device 12 is activated. The A/V device 16 and/or capture device 20 may be activated by receiving a "wake-up" signal from the computing device 12. Alternatively, the A/V device 16 and/or capture device 20 may also include a standby activation unit 464 which activates them in the same manner as the computing device 12 described below.

It is a feature of the present system that it is capable of recognizing the activation phrase with components that operate only on the standby power supplied during the standby power mode. These features are explained below, but in general, using only the standby power, the processor 468 and memory 470 (FIGS. 3B and 6) are capable of receiving a digitized audio pattern, and performing a limited pattern matching against activation patterns stored in memory 470 to determine if an activation phrase was spoken.

The activation phrase may be a simple two-word phrase such as "activate system." Where the system 10 is for example an Xbox® video game console from Microsoft Corporation, the activation phrase may for example be "Xbox on." These phrases are by way of example, and the activation phrase may be any predefined phrase stored in memory 470. The activation phrase may be shorter than two words or longer than two words in further embodiments. Shorter phrases may result in false positive matches more often than longer phrases, but longer phrases may require more power from the standby power for the processor 468 to perform the matching operation. In embodiments, the activation phrase may be set to a length that is optimized for the available standby power. That is, the activation phrase may be sufficiently long to minimize false positive matches, but sufficiently short so that the processor 468 and memory 470 are able to determine when an activation phrase is received using the available standby power.

In embodiments, the activation phrase may be spoken by a user of the system 10 in order to activate the system 10 from standby mode. However, it is understood that the activation phrase may be any distinctive audio pattern, spoken or generated by methods other than speech. Moreover, where spoken, the activation phrase need not be words in a known vocabulary. The activation phrase may be an audio pattern made up of any distinctive pattern of sounds. Where the activation phrase comprises one or more words such as "activate system" or "Xbox on," the activation phrase may be stored in a single language or in multiple languages.

Figure 4:
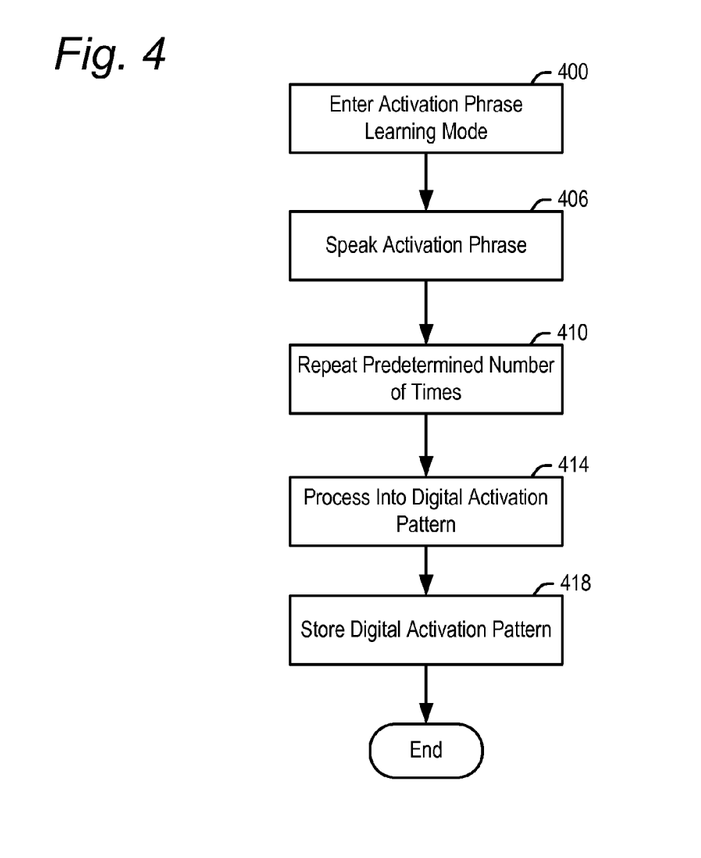
FIG. 4 is a flowchart of an embodiment for teaching and storing an activation phrase.

In embodiments, activation phrases may be pre-programmed in memory 470 by the system 10 supplier, i.e. before initial use of the system 10 by an end-user. Alternatively, the activation phrase may be user-defined. FIG. 4 is a flowchart showing a sequence of steps where one or more users may each generate and store an activation phrase. In step 400, while the system 10 is active, a user may perform a control gesture or selection to enter an activation phrase learning mode. Once in the learning mode, the user may speak the desired activation phrase in step 406. The user may speak the desired activation phrase a single time, or the system may prompt the user to speak the phrase multiple times in step 410.

In step 414, the activation phrase provided by the user is processed into a digital activation pattern. In particular, the one or more received instances of the activation phrase may be passed through an A-to-D (analog to digital) converter to provide a digital stream of the phrase. For instances where the phrase was provided multiple times, anomalous frequencies and/or pronunciations may be filtered out to result in a digital activation pattern best approximating the activation phrase provided by the user in the multiple learning instances. Alternatively, each utterance of the activation phrase from the multiple learning instances may be stored separately and later used for comparison as described below. Once a received activation phrase has been processed into a digital activation pattern, that activation pattern is stored in memory 470 in step 418.

Figure 5:
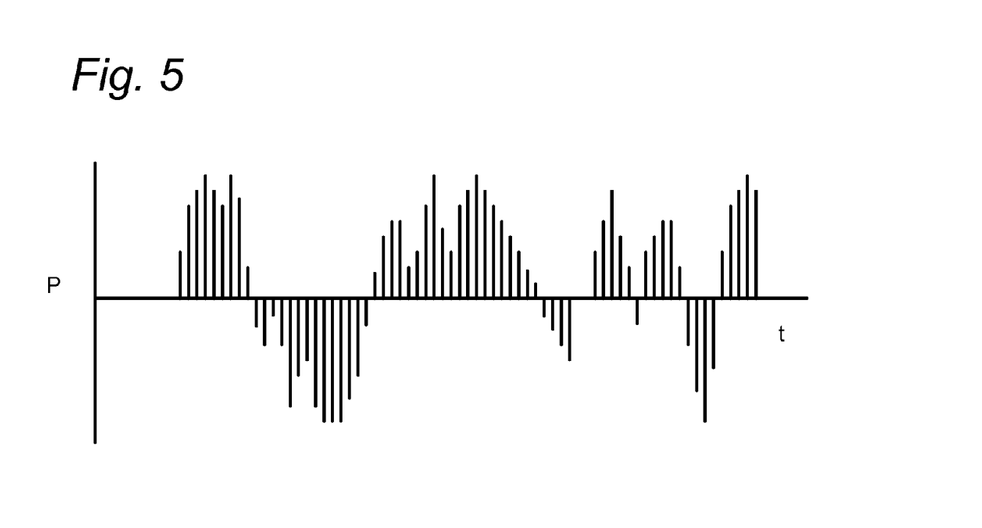
FIG. 5 is a sample digitized activation pattern.

A schematic representation of a stored digitized activation pattern is shown in FIG. 5. The schematic representation shown in FIG. 5 is a digitized representation of an analog audio stream which may be represented as a plot of the displacement (D) of a diaphragm of a microphone with changes in air pressure caused by sound waves over time (t). The digital activation pattern shown in FIG. 5 is by way of example only and the pattern will vary depending on the activation phrase spoken and processed as described above with respect to the flowchart of FIG. 4.

A single activation phrase may be generated and stored via the steps of FIG. 4. Alternatively, multiple activation phrases may be generated and stored. As noted, a single user may generate multiple digitized activation phrases resulting from multiple utterances of the same phrase. Alternatively, different users may generate different activation phrases. For example, where members of a family or group each use the system 10, each user may generate and store his/her own activation phrase(s). The activation phrase generated and stored by each user may the same as each other or different from each other.

In such an embodiment, each user may be recognized based on their particular activation phrase. Thus, when the system activates, the NUI system 10 may be personalized to the identified user, such as for example giving a personalized greeting. Moreover, in such an embodiment, the standby activation unit 464 may take different actions, based on which user is identified from the perceived activation phrase. As one example, the computing device 12 could be set to ignore the activation command from a child at a particular time of the day when the parent did not want the computing device 12 to be used by the child.

Figure 6:
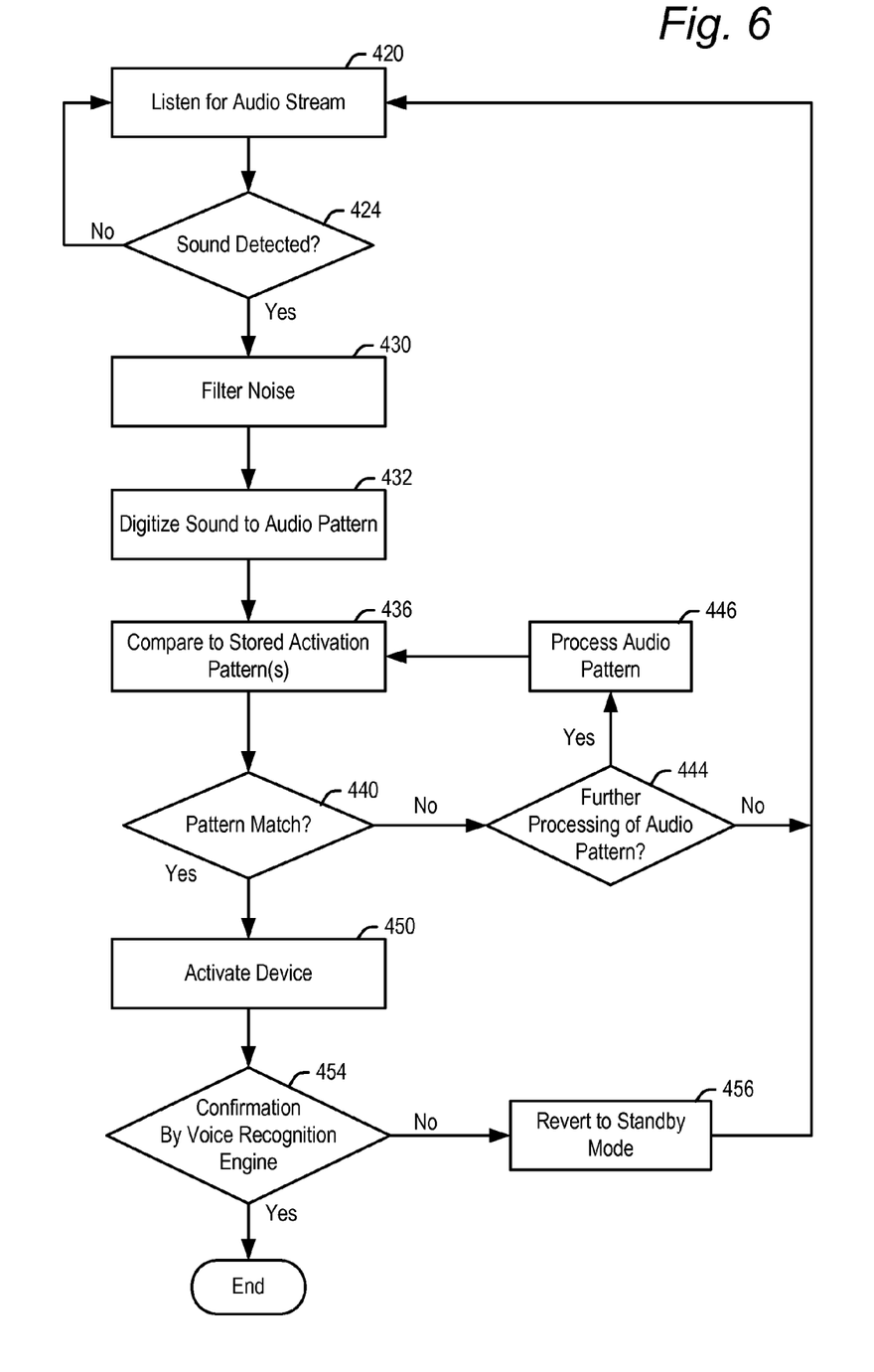
FIG. 6 is a flowchart of an embodiment for activating an electric device when in standby power mode.
Figure 7:
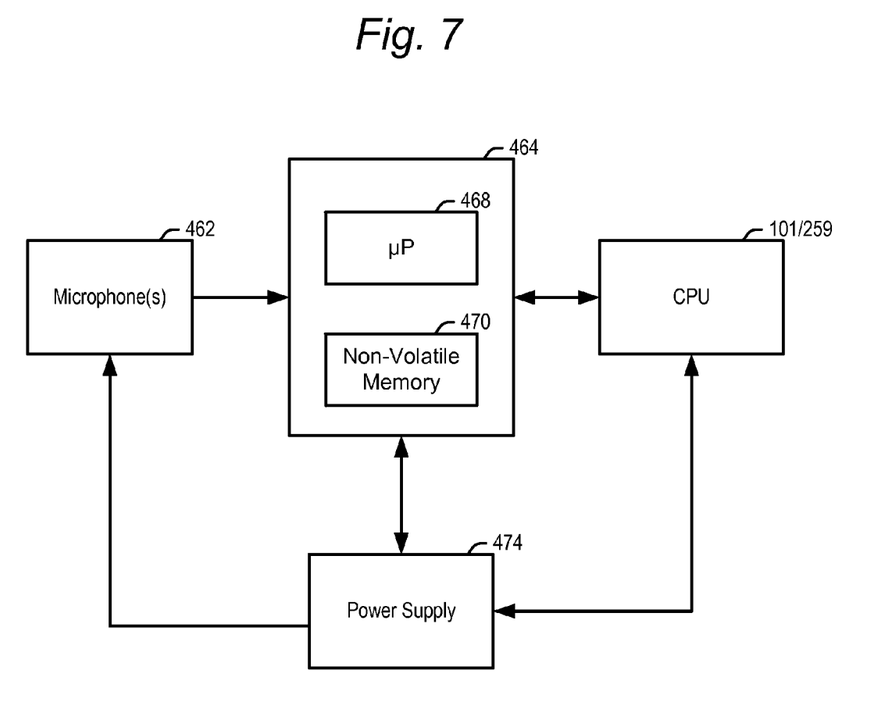
FIG. 7 is a block diagram of an embodiment for activating an electric device when in standby power mode.

After an activation phrase has been pre-programmed or stored by a user as a digital activation pattern, a user may use the activation phrase to activate the computing device 12 from a standby mode to an active mode. FIG. 6 is a flowchart showing a sequence of steps for activating a computing device 12 using the activation phrase, and FIG. 7 is a block diagram showing components for activating a computing device 12 using the activation phrase. FIG. 7 shows the one or more microphones 462 coupled to the standby activation unit 464 including microprocessor 468 and non-volatile memory 470. The microphones 462 may be provided in computing device 12, or they may be the one or more microphones 30 described above with respect to FIG. 2. FIG. 7 further shows a power supply 474. The power supply 474 supplies power to all components of computing device 12, including the one or more microphones 462, the standby activation unit 464 and the CPU 101/259 when the computing device 12 is in active mode. The power supply 474 supplies power to the one or more microphones 462 and the standby activation unit 464 when the computing device 12 is in the standby mode.

As noted above, the standby activation unit 464 may be implemented on a single system on a chip. Alternatively, the microprocessor 468 and memory 470 may be separate components in communication with each other. In further embodiments, a separate microprocessor 468 may be omitted, and instead the standby activation processes described below are performed by the CPU of system 10 (CPU 101 of the multimedia console 100 of FIG. 3A, or CPU 259 of the computing environment 220 of FIG. 3B). In such embodiments, the CPU 101/259 receives the standby power of, for example, 0.5 Watts when the computing device 12 is in the standby power mode. When in standby power mode, the CPU 101/259 would have limited processing capability. Then, when the computing device 12 is activated, the CPU 101/259 would run on higher power to provide full system functionality.

In further embodiments, a separate memory 470 may be omitted, and instead storage of the activation phrase could be done by other non-volatile memory in the computing device 12, such as for example ROM 106 of the multimedia console 100, or ROM 223 of the computing environment 220. In such embodiments, ROM 106/223 may be segmented such that only a small portion of the non-volatile memory is available to the processor when operating in standby mode.

Referring now to the flowchart of FIG. 6, in step 420, the one or more microphones 462 monitor a surrounding environment to listen for an audio stream. If sound is detected in step 424, the audio is filtered in step 430. For example, multi-channel echo cancellation techniques may be used to filter background noise from the received audio stream. Other noise filtering techniques may be used to filter the received audio stream in step 430.

In step 432, the received audio stream is digitized through an A-to-D converter into a digital audio pattern. That pattern is then compared to the activation pattern(s) stored in memory 470. This comparison is performed by the pattern matching engine 192 running in the processor 468. If a pattern match is found within some predefined tolerance between any portion of the streaming digitized audio pattern and the stored activation pattern in step 440, the pattern matching engine 192 sends a signal to the power supply 474 to provide full power to the computing device 12 so as to activate the device.

On the other hand, if no pattern match is found in step 440, the pattern matching engine 192 may attempt further processing of the received digitized audio pattern in step 444. If no pattern match is found (step 440), and the pattern matching engine 192 is not able to process the audio pattern further (step 444), the computing device 12 remains in the standby power mode, and the flow returns to step 420 to listen for further audio. If the pattern matching engine 192 is able to further process the received digitized audio pattern in step 444, the audio pattern is processed in step 446, and it is again compared to the stored activation pattern(s) in step 440.

As one example of processing which may be performed on the received digitized audio pattern in step 446, the pattern matching engine 192 may temporally stretch and/or shrink the received audio pattern to see if it then matches the stored activation pattern(s). Various filters and noise cancellation techniques may also be applied to the audio pattern to see if it then matches the stored activation pattern(s). Other processing of the audio pattern is contemplated.

Processing of the audio pattern as described with respect to step 446 may occur prior to the comparison in step 436 of the digital audio pattern to the stored digital activation pattern(s) instead of or in addition to the flow described above (where processing in step 446 is performed only after a failed comparison in step 440). It is also contemplated that steps 444 and 446 may be omitted. In this embodiment, no processing of the audio pattern is performed. If no match between the received digital audio pattern and the stored activation phrase(s) is found in step 440, the device 12 is not activated.

If a pattern match is found in step 440, the computing device 12 is activated in step 450. At this point, the standby activation unit 464 signals the power source to supply full power to the computing device 12, and all device resources then become available.

Rich voice recognition systems are known that are capable of recognizing speech, for example an activation phrase. However, voice recognition systems require a larger amount of processing power than is available to the computing device 12 in the standby power mode. On the other hand, a limited comparison of a received digitized audio pattern against one or more stored activation patterns by the standby activation unit 464 requires a relatively small amount of processing power, and may be performed in standby mode, where for example 0.5 Watts of power is available.

Comparison of a received audio pattern against several stored activation patterns in step 436 may consume a large amount of power by the processor 468. Similarly, significant processing of the received audio pattern in step 446 may consume a large amount of power by the processor 468. Where a particular implementation of the present system operates with a low standby power level, it may not be possible to have both several stored activation patterns and significant processing of the received audio pattern. In this instance, different embodiments may allocate resources differently. For example, an embodiment may have numerous stored activation patterns and relatively little processing of the received digital audio pattern. Conversely, another embodiment may have only one, or relatively few, stored activation patterns but have more robust processing of the received digitized audio pattern. The number and length of the stored activation patterns and the amount of processing available for the received audio pattern may be set based on the amount of power available for these processes when the computing device 12 is in standby power mode.

As noted above, a received audio pattern may be considered to match a stored activation phrase where the two digital patterns match each other to within some tolerance. Tolerance here refers to the degree to which the received digitized audio pattern needs to match the stored activation pattern. Tolerance may be measured a few different ways in different embodiments. Tolerance may be measured between each data point in the digitized audio pattern and the stored activation pattern, requiring each point, or all points taken together, to have no less than some predefined amplitude difference. Alternatively, the comparison may be made between groups of data points in the digitized audio pattern and the stored activation pattern.

In one example, it is contemplated that the match between the digitized audio pattern and the stored activation pattern needs to be perfect, or near perfect. However, as the same person may utter the same phrase differently at different times, requiring a perfect match may result in a user having difficulty in trying to activate the computing device 12. Thus, in embodiments, the tolerance may be relatively low. This may result in false positive activations. That is, the standby activation unit 464 activates the computing device 12 when no true activation phrase was provided. This will capture instances where the user intends to activate the computing device 12, but may also activate the system when there is no user or the user does not intend to activate the computing device 12.

Where tolerance is low so that false positive activations occur, embodiments of the present system may further include an activation confirmation process, one example of which is shown in steps 454 and 456 of FIG. 6. As noted above, a rich voice recognition engine may not operate on the sparse power available in standby mode. However, once the computing system 12 is activated by the standby activation unit 464 as described above, a voice recognition engine 194 (FIG. 2) may then confirm in step 454 whether the user did in fact speak the correct activation phrase. If so, the computing device may remain activated. If not, a signal may be sent to the power supply 474 to revert back to standby mode in step 456. The flow then returns to step 420 to again listen for possible activation phrases.

In step 454, the voice recognition engine 194 may process the analog audio stream received in step 420 to determine if the proper activation phrase was spoken. Alternatively, the activated computing device 12 may prompt the user to speak additional phrases for analysis by the voice recognition engine 194. The voice recognition engine may use more sophisticated algorithms than the pattern matching performed by the standby activation unit 464 to confirm activation with a much higher degree of certainty.

It is understood that the activation confirmation process may use components and/or software engines instead of or in addition to the voice recognition engine 194 in further embodiments. For example, once activated, a user may be prompted to perform a predefined activation confirmation gesture that is recognized by the NUI system 10 to confirm the user's desire to activate the computing system 12 and to interact with the system 10. Other activation confirmation processes are contemplated.

Moreover, it is understood that the confirmation process of steps 454 and 456 may be omitted altogether. Where the confirmation process is omitted, the computing device 12 may activate upon detecting what is believed to be receipt of the activation phrase. Then, if no further interaction with the system 10 is detected within a predetermined period of time, the computing device 12 may again enter standby power mode.

The sample embodiments set forth above describe a standby activation unit 464 included within a computing device 12 of NUI system 10. However, as noted, the standby activation unit 464 may be provided as part of other electric devices, including a general purpose gaming console or computing environment as described in FIGS. 3A and 3B, respectively. Such systems may be PCs, laptops, smart phones, controllers and/or other handheld computing devices. In further embodiments, the standby activation unit 464 may be included within electric appliances, such as but not limited to washer/dryers, coffee makers, television and stereo systems and electric garage doors. Electric devices having the standby activation unit may further include but are not limited to automobiles, burglar alarm systems and lighting systems. It is understood that the standby activation unit 464 using pattern matching may be used in a wide variety of other electric devices in further embodiments.

Embodiments described above disclose one or more microphones detecting audio within the vicinity of the computing device 12. However, it may happen that a device including the standby activation unit 464 is also able to send and/or receive transmission of a data stream when operating in a standby power mode. In such embodiments, it is contemplated that the audio source may be remote from the computing device 12.

For example, an audio source may be detected at a first location, and then transmitted to a device at a second location, for example via a network such as a wireless network, a local area network, a broadband network and/or the Internet. The audio source may be digitized and/or processed by devices at the first or second locations. Thereafter, the standby activation unit 464 in the device at the second location may perform the matching comparison described above to determine if the audio received from the device at the first location is the proper activation phrase. If so, the device at the second location may be activated. Alternatively, the device at the second location may send a transmission back to the device at the first location, or send a transmission to a device at a third location different than the first or second locations, to activate the device at the first or third locations.

The foregoing detailed description of the inventive system has been presented for purposes of illustration and description. It is not intended to be exhaustive or to limit the inventive system to the precise form disclosed. Many modifications and variations are possible in light of the above teaching. The described embodiments were chosen in order to best explain the principles of the inventive system and its practical application to thereby enable others skilled in the art to best utilize the inventive system in various embodiments and with various modifications as are suited to the particular use contemplated. It is intended that the scope of the inventive system be defined by the claims appended hereto.

What is claimed:

1. A method for activating an electric device from a standby power mode, comprising:
   (a) receiving an audio stream in the electric device when in standby power mode;
   (b) digitizing the audio stream to an audio pattern when in standby power mode;
   (c) comparing the audio pattern digitized in said step (b) to a digitized activation phrase stored in a non-volatile memory when in standby power mode;
   (d) activating the electric device where the audio pattern matches the activation phrase to within a predefined tolerance; and
   (e) confirming the audio pattern matches the activation phrase, after activation of the electric device in said step (d), using resources available to the electric device when activated.

2. The method of claim 1, wherein a microphone continuously monitors a surrounding environment for the audio stream of said step (a).

3. The method of claim 1, further comprising the step of filtering out noise from the received audio stream prior to comparison of the digitized audio pattern to a digitized activation phrase.

4. The method of claim 3, wherein said filtering step comprises multi-channel noise echo cancellation.

5. The method of claim 1, further comprising the step of processing the digitized audio pattern.

6. The method of claim 5, wherein said processing of the digitized audio pattern occurs prior to comparing the digitized audio pattern to the digitized activation pattern.

7. The method of claim 5, wherein said processing of the digitized audio pattern occurs only after a comparison in said step (c) fails to identify a pattern match within the predefined tolerance.

8. The method of claim 5, wherein said processing of the digitized audio pattern includes temporally stretching and shrinking the digital audio pattern.

9. The method of claim 1, wherein the digitized activation pattern is stored in the non-volatile memory of the electric device prior to initial use of the electric device by a user.

10. The method of claim 1, wherein the digitized activation pattern is selected by a user upon prompting by the electric device.

11. A standby activation system for activating an electric device from a standby power mode, the standby activation unit comprising:
    one or more microphones for detecting an audio stream in a vicinity of the one or more microphones; and
    a standby activation unit, including:
       a non-volatile memory including one or more stored activation patterns, and
       a processor for comparing a digitized audio pattern received from the one or more microphones to the one or more stored activation patterns stored in the non-volatile memory using power available to the electric device in standby power mode, the processor activating the device if the digitized audio pattern matches an activation phrase of the one or more activation phrases stored in the non-volatile memory to within a predefined tolerance, and the processor reverting the electric device to standby power mode upon activation if resources available to the electric device when activated do not confirm that the audio stream was a spoken activation command.

12. The standby activation system of claim 11, wherein the processor for comparing the digitized audio pattern to the one or more stored activation patterns in standby power mode is a first processor, the electric device including a second processor, separate from the first processor, for controlling functions of the electric device when the device is operating in an activated, full power mode.

13. The standby activation system of claim 11, wherein the non-volatile memory including one or more stored activation patterns is a first non-volatile memory, the electric device including a second non-volatile memory, separate from the first non-volatile memory, for storing data of the electric device used when the device is operating in an activated, full power mode.

14. The standby activation system of claim 11, wherein the non-volatile memory and processor are integrated as a system on a chip into the electric device.

15. The standby activation system of claim 11, wherein the power available to the electric device in standby power mode is between 5.0 Watts and 0.3 Watts.

16. The standby activation system of claim 11, wherein the power available to the electric device in standby power mode is 0.5 Watts.

17. A method for activating a computing device of a NUI system from a standby power mode, comprising:
    (a) receiving an audio stream in one or more microphones associated with the NUI system when in standby power mode;
    (b) digitizing the audio stream to an audio pattern when in standby power mode;
    (c) processing the digitized audio stream to facilitate matching of the digitized audio stream with one or more digitized activation phrases stored in a non-volatile memory of the computing device when in standby power mode;
    (d) comparing the audio pattern processed in said step (c) to one or more digitized activation phrases stored in the non-volatile memory of the computing device when in standby power mode;
    (e) activating the computing device where the audio pattern matches an activation phrase of the one or more activation phrases to within a predefined tolerance; and
    (f) confirming whether activation was intended after the computing device is activated in said step (e) upon a match between the audio pattern and the activation phrase, said step of confirming using a voice recognition engine available to the computing device upon full activation of the computing device.

18. The method of claim 17, further comprising the step of one or more users generating the activation phrase stored in the non-volatile memory, the step of one or more users generating the activation phrase occurring while the computing device is running in an activated full power mode.

* * * * *